United States Patent
Balasubramanian et al.

(10) Patent No.: US 12,120,507 B2
(45) Date of Patent: Oct. 15, 2024

(54) METHODS FOR SECURE SIDELINK POSITIONING

(71) Applicant: QUALCOMM Incorporated, San Diego, CA (US)

(72) Inventors: Anantharaman Balasubramanian, San Diego, CA (US); Dan Vassilovski, Del Mar, CA (US); Hong Cheng, Basking Ridge, NJ (US); Soo Bum Lee, San Diego, CA (US); Gabi Sarkis, San Diego, CA (US); Shuanshuan Wu, San Diego, CA (US); Kapil Gulati, Belle Mead, NJ (US); Gene Wesley Marsh, San Diego, CA (US)

(73) Assignee: QUALCOMM Incorporated

( * ) Notice: Subject to any disclaimer, the term of this patent is extended or adjusted under 35 U.S.C. 154(b) by 337 days.

(21) Appl. No.: 17/830,198

(22) Filed: Jun. 1, 2022

(65) Prior Publication Data

US 2023/0396999 A1    Dec. 7, 2023

(51) Int. Cl.
*H04W 12/0431* (2021.01)
*H04L 5/00* (2006.01)
*H04W 12/041* (2021.01)
*H04W 12/108* (2021.01)

(52) U.S. Cl.
CPC ........ *H04W 12/0431* (2021.01); *H04L 5/0051* (2013.01); *H04W 12/041* (2021.01); *H04W 12/108* (2021.01)

(58) Field of Classification Search
CPC ................................................ H04W 12/0431
See application file for complete search history.

(56) References Cited

U.S. PATENT DOCUMENTS

| 9,544,766 B2 * | 1/2017 | Hranilovic | H04L 63/18 |
| 2004/0157619 A1 * | 8/2004 | Corson | H04W 12/122 |
| | | | 455/456.1 |
| 2007/0036353 A1 * | 2/2007 | Reznik | H04L 63/0428 |
| | | | 380/30 |
| 2013/0294604 A1 * | 11/2013 | Chou | H04L 63/18 |
| | | | 380/278 |
| 2014/0093079 A1 * | 4/2014 | Scott | H04L 9/0819 |
| | | | 380/270 |
| 2021/0051005 A1 * | 2/2021 | Kunz | H04W 12/04 |
| 2021/0311158 A1 * | 10/2021 | Akkarakaran | G01S 5/0036 |

(Continued)

FOREIGN PATENT DOCUMENTS

WO    WO-2013118096 A1 *  8/2013   ........... H04L 63/062

*Primary Examiner* — Ponnoreay Pich
(74) *Attorney, Agent, or Firm* — QUALCOMM Incorporated

(57) ABSTRACT

Methods, systems, and devices for wireless communications are described. A target user equipment (UE) may receive an indication of a session key from an initiator UE in a sidelink communications system, from a network entity (e.g., a base station), or the like. In some cases, the target UE may also receive an indication of a nonce in a message of a PRS procedure. The target UE may select a positioning reference signal (PRS) sequence for the PRS procedure using the session key and optionally the nonce, such as by using a defined function at the target UE with the session key and the nonce as an input. Once the target UE selects the PRS sequence, the target UE may encode the PRS sequence and may transmit the PRS sequence to the initiator UE.

30 Claims, 11 Drawing Sheets

(56) References Cited

U.S. PATENT DOCUMENTS

| | | | |
|---|---|---|---|
| 2023/0095651 A1* | 3/2023 | Balasubramanian | ..................... H04L 9/0872 380/270 |
| 2023/0097712 A1* | 3/2023 | Sullivan | ............... H04W 76/10 713/171 |

* cited by examiner

METHODS FOR SECURE SIDELINK POSITIONING

FIELD OF TECHNOLOGY

The following relates to wireless communications, including methods for secure sidelink positioning.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support methods for secure sidelink positioning. For example, the described techniques provide for a target user equipment (UE) (which may be an example of or be referred to as a first UE herein) to select a positioning reference signal (PRS) sequence for a PRS procedure with an initiator UE (which may be an example of or be referred to as a second UE herein). For example, the target UE may receive an indication of a session key from the initiator UE, from a network entity (e.g., a base station), or the like. The target UE may select the PRS sequence using the session key, such as by using a defined mapping or function at the target UE with the session key as an input. In some cases, once the target UE selects the PRS sequence, the target UE may encode the PRS sequence and may transmit the PRS sequence to the initiator UE.

A method for wireless communication at a first UE is described. The method may include receiving an indication of a session key for a PRS procedure to be performed with at least a second UE, selecting a PRS sequence for the PRS procedure based on the session key, and transmitting the selected PRS sequence to the second UE.

An apparatus for wireless communication at a first UE is described. The apparatus may include a processor, memory coupled with the processor, and instructions stored in the memory. The instructions may be executable by the processor to cause the apparatus to receive an indication of a session key for a PRS procedure to be performed with at least a second UE, select a PRS sequence for the PRS procedure based on the session key, and transmit the selected PRS sequence to the second UE.

Another apparatus for wireless communication at a first UE is described. The apparatus may include means for receiving an indication of a session key for a PRS procedure to be performed with at least a second UE, means for selecting a PRS sequence for the PRS procedure based on the session key, and means for transmitting the selected PRS sequence to the second UE.

A non-transitory computer-readable medium storing code for wireless communication at a first UE is described. The code may include instructions executable by a processor to receive an indication of a session key for a PRS procedure to be performed with at least a second UE, select a PRS sequence for the PRS procedure based on the session key, and transmit the selected PRS sequence to the second UE.

Some examples of the method, apparatuses, and non-transitory computer-readable medium described herein may further include operations, features, means, or instructions for receiving a first message of the PRS procedure including a nonce for the PRS sequence, where selecting the PRS sequence may be based on the nonce and the session key.

Some examples of the method, apparatuses, and non-transitory computer-readable medium described herein may further include operations, features, means, or instructions for receiving a first message of the PRS procedure including a nonce for a second session key for a second message of the PRS procedure and transmitting the second message according to the second session key.

Some examples of the method, apparatuses, and non-transitory computer-readable medium described herein may further include operations, features, means, or instructions for transmitting, to the second UE, a public key of a public-private key pair associated with the first UE, receiving the session key from the second UE, the session key encoded according to the public key, and decoding the session key using a private key of the public-private key pair.

In some examples of the method, apparatuses, and non-transitory computer-readable medium described herein, selecting the PRS sequence may include operations, features, means, or instructions for selecting the PRS sequence based on a UE-specific key associated with the first UE, a nonce corresponding to the PRS sequence, or both.

Some examples of the method, apparatuses, and non-transitory computer-readable medium described herein may further include operations, features, means, or instructions for receiving, from the second UE, a first message of the PRS procedure and decoding the first message using the session key and a source identifier (ID) for the second UE.

Some examples of the method, apparatuses, and non-transitory computer-readable medium described herein may further include operations, features, means, or instructions for encoding measurement information associated with the PRS sequence using a UE-specific key corresponding to the first UE and transmitting the encoded measurement information to the second UE.

Some examples of the method, apparatuses, and non-transitory computer-readable medium described herein may further include operations, features, means, or instructions for transmitting a message authentication code for the encoded measurement information associated with the PRS sequence.

Some examples of the method, apparatuses, and non-transitory computer-readable medium described herein may further include operations, features, means, or instructions for receiving, from the second UE, a second PRS sequence based on transmitting the selected PRS sequence.

In some examples of the method, apparatuses, and non-transitory computer-readable medium described herein, receiving the indication of the session key may include operations, features, means, or instructions for receiving the session key from a network entity, where the session key may be shared across a set of multiple UEs including at least the first UE and the second UE.

Some examples of the method, apparatuses, and non-transitory computer-readable medium described herein may further include operations, features, means, or instructions for generating the session key based on a key derivation function.

In some examples of the method, apparatuses, and non-transitory computer-readable medium described herein, the session key may be based on the indication of the session key and a source ID associated with the first UE.

A method for wireless communication at a second UE is described. The method may include transmitting an indication of a session key for a PRS procedure to be performed with at least a first UE and receiving, from the first UE, a PRS sequence of the PRS procedure according to the session key.

An apparatus for wireless communication at a second UE is described. The apparatus may include a processor, memory coupled with the processor, and instructions stored in the memory. The instructions may be executable by the processor to cause the apparatus to transmit an indication of a session key for a PRS procedure to be performed with at least a first UE and receive, from the first UE, a PRS sequence of the PRS procedure according to the session key.

Another apparatus for wireless communication at a second UE is described. The apparatus may include means for transmitting an indication of a session key for a PRS procedure to be performed with at least a first UE and means for receiving, from the first UE, a PRS sequence of the PRS procedure according to the session key.

A non-transitory computer-readable medium storing code for wireless communication at a second UE is described. The code may include instructions executable by a processor to transmit an indication of a session key for a PRS procedure to be performed with at least a first UE and receive, from the first UE, a PRS sequence of the PRS procedure according to the session key.

Some examples of the method, apparatuses, and non-transitory computer-readable medium described herein may further include operations, features, means, or instructions for transmitting a first message of the PRS procedure including a nonce for the PRS sequence.

Some examples of the method, apparatuses, and non-transitory computer-readable medium described herein may further include operations, features, means, or instructions for transmitting a first message of the PRS procedure including a nonce for a second session key for a second message of the PRS procedure and receiving the second message according to the second session key.

Some examples of the method, apparatuses, and non-transitory computer-readable medium described herein may further include operations, features, means, or instructions for receiving, from the first UE, a public key of a public-private key pair associated with the first UE, encoding the session key using the public key of the public-private key pair, and transmitting the encoded session key.

Some examples of the method, apparatuses, and non-transitory computer-readable medium described herein may further include operations, features, means, or instructions for generating a UE-specific key corresponding to the second UE based on the session key and a source ID for the second UE, encoding a first message of the PRS procedure using the UE-specific key, and transmitting the encoded first message to the first UE.

Some examples of the method, apparatuses, and non-transitory computer-readable medium described herein may further include operations, features, means, or instructions for receiving, from the first UE, measurement information associated with the PRS sequence and decoding the measurement information using the session key, a source ID for the first UE, or both.

Some examples of the method, apparatuses, and non-transitory computer-readable medium described herein may further include operations, features, means, or instructions for receiving a message authentication code for the measurement information associated with the PRS sequence, where decrypting the measurement information may be based on the message authentication code.

Some examples of the method, apparatuses, and non-transitory computer-readable medium described herein may further include operations, features, means, or instructions for transmitting, to the first UE, a second PRS sequence based on receiving the PRS sequence.

Some examples of the method, apparatuses, and non-transitory computer-readable medium described herein may further include operations, features, means, or instructions for receiving the session key from a network entity, where the session key may be shared across a set of multiple UEs including at least the first UE and the second UE.

Some examples of the method, apparatuses, and non-transitory computer-readable medium described herein may further include operations, features, means, or instructions for generating the session key based on a key derivation function.

DETAILED DESCRIPTION

Some wireless communications systems may implement sidelink communication in which one or more user equipment (UEs) may communicate directly with each other. For example, one or more vehicles in a vehicle communication system, such as in a vehicle to everything (V2X) system, may perform sidelink ranging to determine positioning information for the vehicles when a global navigation satellite system (GNSS) (e.g., GPS) or other positioning services are unavailable. In some cases, the sidelink ranging may include one or more UEs exchanging reference signals, such as positioning reference signals (PRSs), to determine location measurements. For example, one or more UEs may perform a ranging procedure including a pre-PRS with one or more session parameters and target UEs, a PRS (e.g., wideband reference signal), and a post-PRS with one or more PRS measurements and UE information. The post-PRS may include a round-trip time (RTT) measurement, location information, and a motion state (e.g., if known by the UE). However, a ranging procedure between UEs may be prone to or otherwise vulnerable to attacks. For example, an attacker may predict a PRS and replicate the PRS in advance of the genuine signal.

As described herein, a UE may protect one or more PRS messages of a PRS procedure using cryptographic keys. For example, an initiator UE may transmit an indication of a session key for a PRS procedure to one or more target UEs. The initiator UE may encrypt, or encode, the session key using a public key of a public-private key pair at each target UE. In some cases, the initiator UE may transmit a pre-PRS message of the PRS procedure with a nonce, which may be a random, or pseudo-random, number in some examples. A target UE may select a PRS sequence for the PRS procedure based on the session key. In some cases, the target UE may transmit the PRS sequence to the initiator UE. For example, the target UE may encode the PRSs using the session key and the nonce. In some other examples, the target UE may receive one or more PRSs encoded using the session key and the nonce. The target UE may transmit one or more post-PRS measurements to the initiator UE, which may also be encoded using the session key and the nonce. In some other examples, the post-PRS measurements may be encoded using a UE-specific key based on the session key and a UE identifier (ID).

Aspects of the disclosure are initially described in the context of wireless communications systems. Aspects of the disclosure are further described in the context of process flows. Aspects of the disclosure are further illustrated by and described with reference to apparatus diagrams, system diagrams, and flowcharts that relate to methods for secure sidelink positioning.

Figure 1:
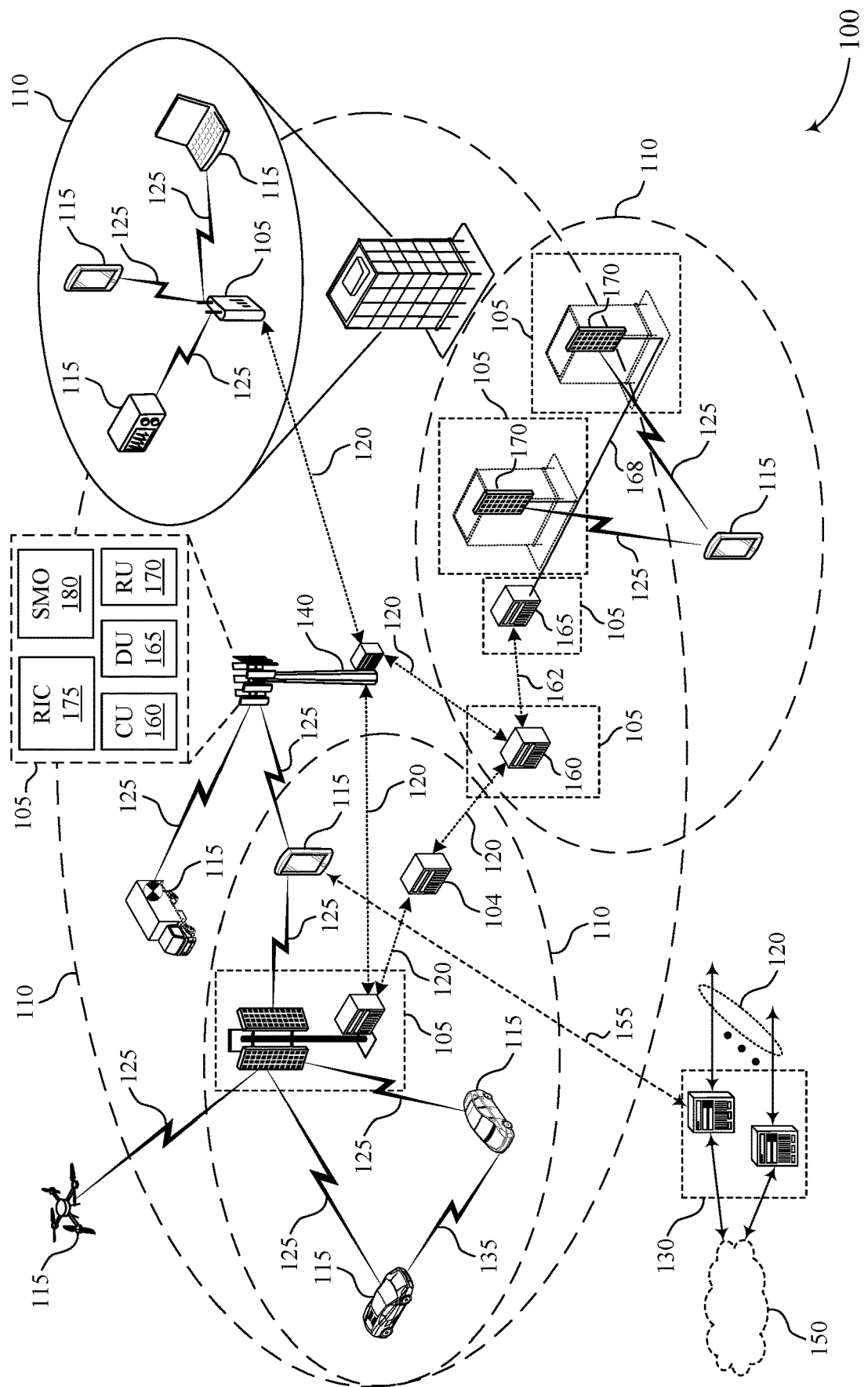
FIGS. 1 and 2 illustrate examples of wireless communications systems that support methods for secure sidelink positioning in accordance with one or more aspects of the present disclosure.

FIG. 1 illustrates an example of a wireless communications system 100 that supports methods for secure sidelink positioning in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170).

A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support methods for secure sidelink positioning as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an ID for distinguishing neighboring cells (e.g., a physical cell ID (PCID), a virtual cell ID (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz).

Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some examples, a UE 115 may protect one or more PRS messages of a PRS procedure using cryptographic keys. For example, an initiator UE 115 or a network entity 105 may transmit an indication of a session key for a PRS procedure to one or more target UEs 115. The initiator UE 115 may encrypt, or encode, the session key using a public key of a public-private key pair at each target UE 115. In some cases, the initiator UE 115 may transmit a pre-PRS message of the PRS procedure with a nonce, which may be a random, or pseudo-random, number. A target UE 115 may select a PRS sequence for the PRS procedure based on the session key. In some cases, the target UE 115 may transmit the PRS sequence to the initiator UE 115. For example, the target UE 115 may encode the PRSs using the session key and the nonce. In some other examples, the target UE 115 may receive one or more PRSs encoded using the session key and the nonce. The target UE 115 may transmit one or more post-PRS measurements to the initiator UE 115, which may also be encoded using the session key and the nonce. In some other examples, the post-PRS measurements may be encoded using a UE-specific key based on the session key and a UE ID.

Figure 2:
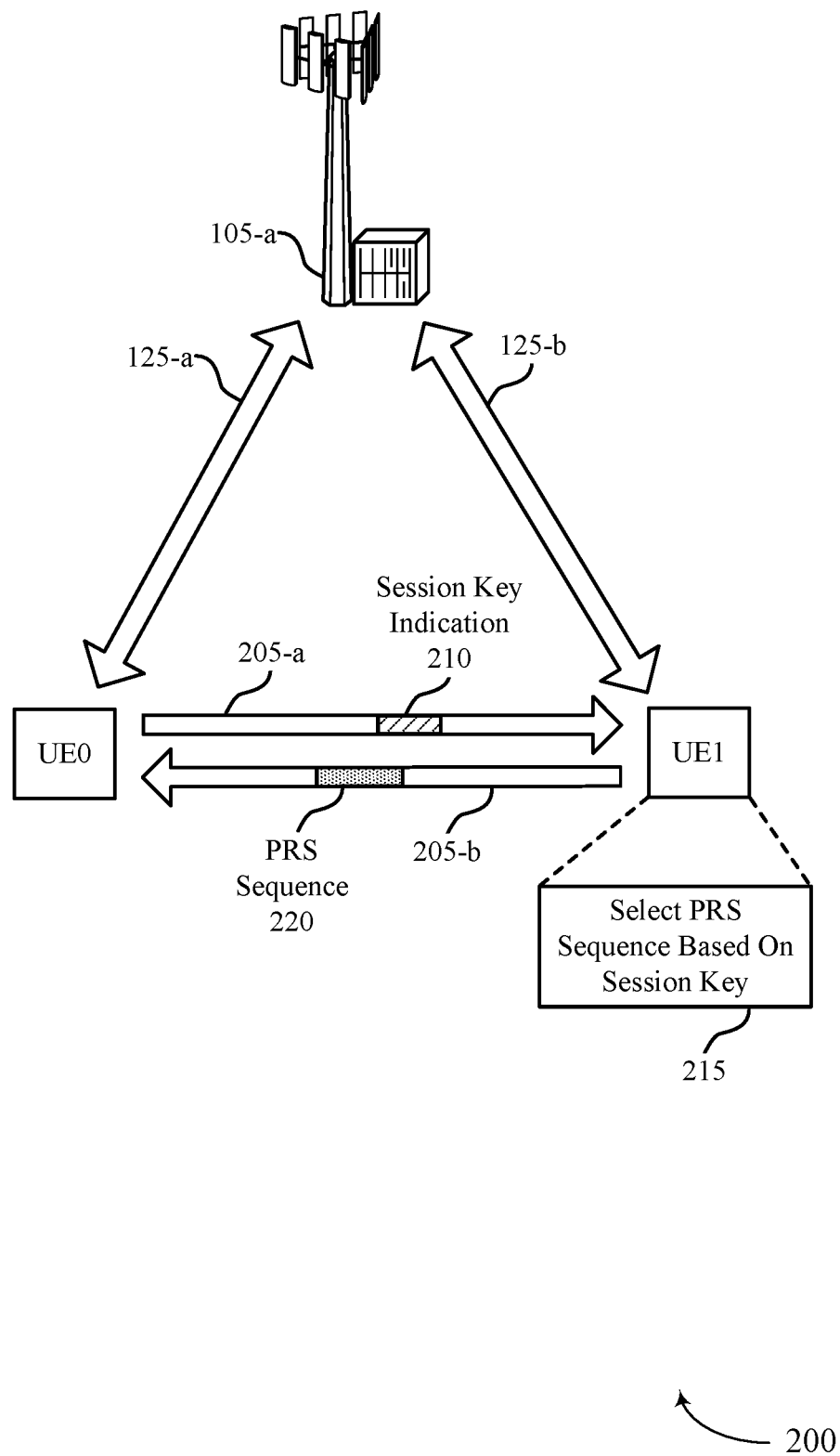

FIG. 2 illustrates an example of a wireless communications system 200 that supports methods for secure sidelink positioning in accordance with one or more aspects of the present disclosure. The wireless communications system 200 may implement or be implemented to realize aspects of the wireless communications system 100. For example, the wireless communications system 200 illustrates communication between one or more UEs and network entities, such as a UE0, a UE1, and a network entity 105-*a*, which may be examples of corresponding devices described herein, including with reference to FIG. 1. The wireless communications system 200 may support signaling indicating a session key from an initiator UE, such as UE0, to a target UE, such as UE1, for a PRS procedure.

In some examples, one or more UEs, such as UE0 and UE1, may communicate with each other directly, which may be referred to as sidelink communications. For example, UE0 may exchange data and control signaling with UE1 via a sidelink communication link 205-*a*, while UE1 may exchange data and control signaling with UE0 via a sidelink communication link 205-b. Similarly, the UEs may be in communication with a network entity 105-a. The network entity may exchange data and control signaling with the UE0 and the UE1 via a communication link 125-a and a communication link 125-b, respectively, which may be examples of communication links 125 as described with reference to FIG. 1.

In some examples, the UE0 and the UE1 may perform a sidelink ranging procedure, in which the UE1 may initiate transmission of one or more PRSs to and from UE1. The UE0 may use the PRSs to determine a position, or location, of the UE1. For example, the UE0 (e.g., an initiator UE) may be a roadside unit (RSU) or an on-board unit (OBU) in a V2X system, and may initiate a ranging procedure with a vehicle UE in the V2X system. Each UE may participate in multiple sidelink ranging procedures simultaneously. The UE0 and the UE1 may use the sidelink ranging procedure in cases where GNSS or network-based positioning (e.g., using the network entity 105-a) may be unavailable. Additionally, or alternatively, the UE0 and the UE1 may use the sidelink ranging procedure for applications, such as a digital key for a vehicle, where a vehicle UE may unlock by inferring that a digital key (e.g., with a driver of the vehicle) is within a prespecified range. However, the sidelink ranging procedure may be prone or otherwise vulnerable to attacks. For example, an attacker may predict one or more PRSs from a target UE to an initiator UE (e.g., PRSs from UE1 to UE0) and may transmit a copy of the predicted PRSs in a time-advanced manner to replicate the PRS transmission. That is, an attacker may predict an attack signal based on a signal from an initiator UE (e.g., UE0), and the attacker may transmit the attack signal in advance of the genuine signal from a target UE (e.g., UE1). This may imitate the arrival path of the genuine signal, causing the UE0 to perform one or more tasks for the attacker (e.g., unlock a vehicle).

In some examples, to increase security for the sidelink ranging procedure (e.g., a PRS procedure), the UEs may transmit PRSs using cryptographic keys to obtain positioning information and range information. In some cases, UE0 (e.g., an initiator UE) may perform a PRS procedure with one or more additional UEs in a one-to-one or a one-to-many request-response handshake. For example, the UE0 may perform a ranging exercise with UE1, or any additional UEs, based on a measured round trip time (RTT) of a PRS. Each UE in communication with the UE0 may report a RTT measured to participating UEs, along with a known location. In some cases, UE0 and UE1 may exchange PRSs, and the UE1 may indicate a RTT measurement to the UE0 based on an amount of time for the PRS to travel from the UE0 to the UE1 and back. If the UE1 does not know a location for the UE1 (e.g., for UEs having zero or inaccurate knowledge of their position), the RTT may yield an inter-UE range. Additionally, or alternatively, if the UE1 has accurate knowledge of its position (e.g., a RSU in a V2X system), the range may yield an absolute position.

In some examples, a PRS procedure, which may also or alternatively be referred to as a sidelink positioning session, a sidelink ranging procedure, a sidelink positioning procedure, or the like, may include multiple signals, such as a pre-PRS, a PRS session with multiple PRS sequences, and a post-PRS. For a PRS procedure with N UEs (e.g., N UEs that may not be associated with a group at the V2X layer), each of the UEs may transmit a sidelink pre-PRS, post-PRS, and participate in the PRS session to perform ranging and positioning measurements. To enable secure transmission of the pre-PRS, post-PRS, and the PRS sequences for the wireless communications system 200 (e.g., with N UEs including UE0 and UE1), the UEs may derive one or more shared and private cryptographic keys common to the N UEs in the system. The UEs may use the cryptographic keys to protect the pre-PRS, post-PRS, and the PRS sequences at the different UEs to enhance positioning security. The UEs may derive the cryptographic keys used by other UEs participating in the ranging session implicitly.

In some examples, a target UE, such as UE1, may receive a session key indication 210 for PRS procedure with at least one initiator UE, such as UE0. For example, UE0 may transmit the session key indication 210 to the UE1 via the sidelink communication link 205-a. UE0 may generate the session key, $K_S$, independent from UE1. In some cases, UE0 may use one or more public keys of target UEs to transmit the session key indication 210, indicating $K_S$, to the target UEs. For example, the UE0 may obtain the public key of UE1, $K_{P_1}$, and may encode $K_S$ using a standardized key encoding function, $f$ (e.g., $f(K_S, K_{P_1})$). The UE0 may transmit the encoded $K_S$ to UE1 in the session key indication 210. The target UEs may obtain $K_S$ using their individual private keys. For example, UE1 may obtain $K_S$ using a standardized key decoding function, $\tilde{f}$ (e.g., $K_S = \tilde{f}(K_S, \tilde{K}_{P_1})$), where $\tilde{K}_{P_1}$ is UE1's private key.

Additionally, or alternatively, the network entity 105-a may distribute a common key, $K_c$, to the UEs that may participate in any PRS procedure (e.g., at the V2X layer) in a session key indication 210. For example, the network entity 105-a may distribute $K_c$ to UE0 and UE1 via the communication link 125-a and the communication link 125-b, respectively. In some cases, $K_c$ may be preconfigured or otherwise defined at the UEs. The UE0 may discover a set of target UEs, including UE1, and may provide the target UEs with a nonce, R, which may be a random or semi-random number generated for a specific use. The target UEs and initiator UE may generate $K_S$ using R and $K_c$ as inputs to a key derivation function, KDF (e.g., $K_S = KDF(K_c, R)$). The UE0, the UE1, or both may derive $K_S$ based on the session key indication 210 (e.g., including $K_c$ or $K_S$). In some examples, the key derivation function may be an example of a cryptographic algorithm that derives or otherwise generates one or more keys using a pseudorandom function.

In some examples, each UE may derive a UE-specific key for transmitting a pre-PRS, the PRS sequence, and post-PRS from $K_S$ and a source ID (e.g., an L1 source ID). In some cases, UE1 may derive a UE-specific key $K_{UE1}$ using the key derivation function, KDF, as $K_{UE1=KDF(KS,}$ UE1's L1 source ID), where KDF may be a preconfigured or otherwise defined key derivation function. Similarly, UE0 may derive a UE-specific key $K_{UE0}$ using the key derivation function, KDF, as $K_{UE0} = KDF(K_S$, UE0's L1 source ID). In some examples, a UE may use a UE-specific key (e.g., UE1 uses $K_{UE1}$, UE0 uses $K_{UE0}$) to encrypt a pre-PRS message, which is described in further detail with respect to FIG. 3. In some other examples, a UE may use a UE-specific key to provide a message authentication code for an unscrambled (e.g., plain) pre-PRS message or for an encrypted pre-PRS message along with the pre-PRS message. The UE0 may transmit a nonce, $R_0$, in its secure pre-PRS message, which the UE1 may use as a parameter for PRS sequence generation and selection. Similarly, UE1 may transmit a nonce, $R_1$, in a secure pre-PRS message, which UE0 may use as a parameter for generating the key to be used for a secure post-PRS transmission.

At 215, the UE 1 may use $K_S$ to select a PRS sequence 220 for a PRS procedure. For example, a target UE, such as UE1, may use the UE specific key, $K_{UE1}$, to choose a PRS sequence 220 to transmit according to a define, or preconfigured, function, g (e.g., PRS sequence transmitted by UE1=g($K_{UE1}$, PRS sequence set). That is, UE1 may choose the last 6 bits of $K_{UE1}$ to select a PRS sequence 220 out of 64 preconfigured PRS sequences. In some other examples, UE1 may use the UE specific key, $K_{UE1}$, and a nonce $R_0$ that UE1 transmits in the secure pre-PRS message to choose the PRS sequence 220 (e.g., PRS sequence transmitted by UE1=g($K_{UE1}$, $R_0$, PRS sequence set)). The UE1 may transmit the PRS sequence 220 based on the selecting at 215. Additionally, or alternatively, UE0 may transmit a PRS sequence 220 to UE1.

In some examples, UE1 may use $K_{UE1}$ to encrypt a post-PRS message, which may include measurement information for a PRS sequence 220 from UE0, to provide a message authentication code for the encrypted or unencrypted post-PRS message, or both. In some other examples, UE1 may derive a post-PRS key using $K_{postPRS,UE1}$=g($K_{UE1}$, $R_1$), where $R_1$ is the nonce the UE1 transmitted in the secure pre-PRS message. If the UEs in the session transmit a same PRS (e.g., using the session key, $K_S$), it may be relatively easy for an attacker to learn the PRS used and perform attacks. Thus, the UEs (e.g., UE0 and UE1) may generate the PRS sequence based on the UE-specific keys and the nonce. In some cases, the initiator UE (e.g., UE0) may transmit the session key indication 210 (e.g., to come to a common key agreement) as a one-time operation. UE0 may transmit the session key indication 210 as a unicast transmission to any number of target UEs (e.g., (N−1) UEs, where N is a total number of UEs in a PRS session). The UEs may each derive a UE-specific key and may change the UE-specific key dynamically (e.g., on the fly) using a nonce, or other parameters that may be transmitted though secured pre-PRSs.

Figure 3:
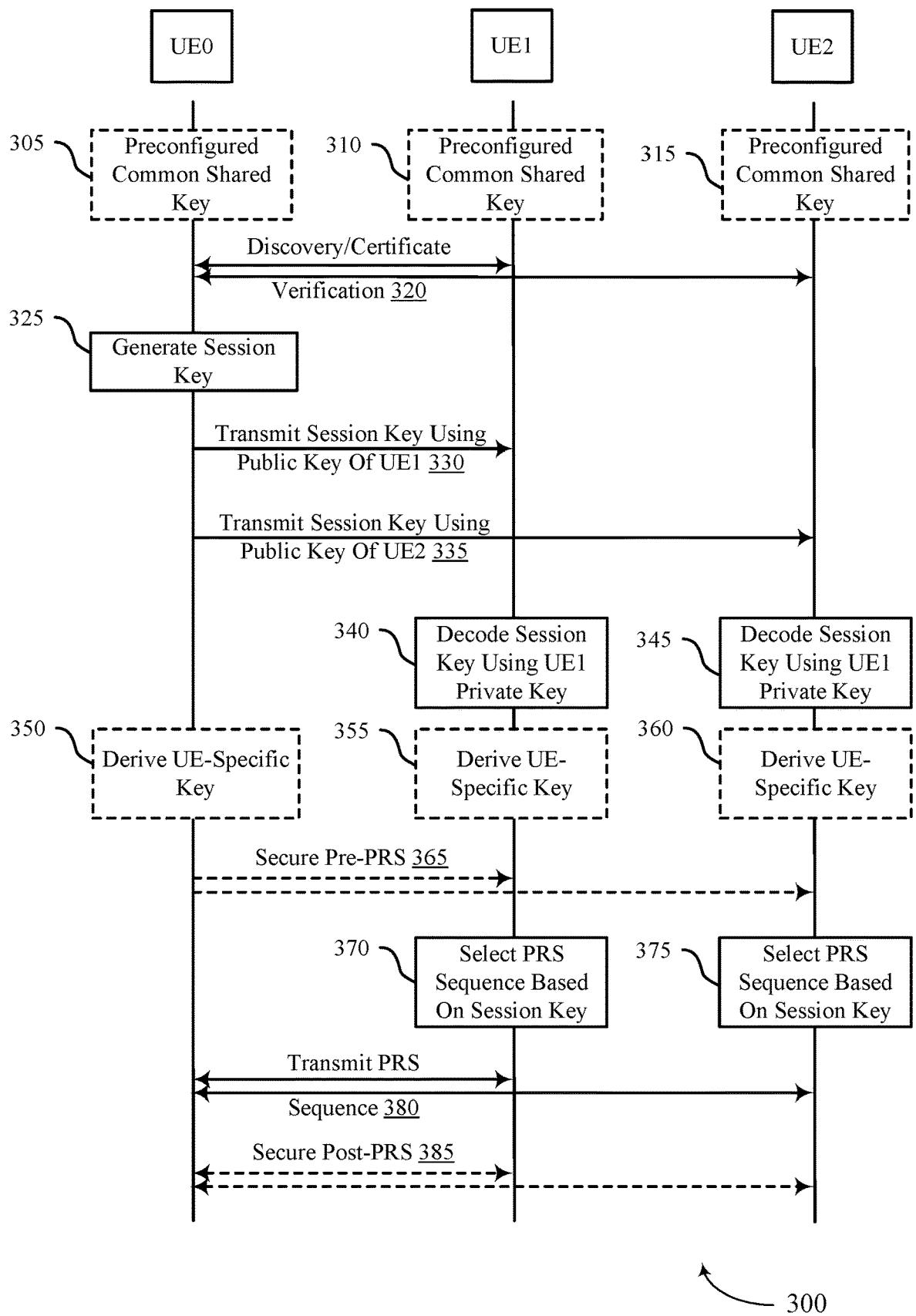
FIG. 3 illustrates an example of a process flow that supports methods for secure sidelink positioning in accordance with one or more aspects of the present disclosure.

FIG. 3 illustrates an example of a process flow 300 that supports methods for secure sidelink positioning in accordance with one or more aspects of the present disclosure. In some examples, the process flow 300 may implement aspects of the wireless communications system 100 and the wireless communications system 200. The process flow 300 may illustrate an example of a UE0 using cryptographic keys to perform a PRS procedure with a UE1 and a UE2 via sidelink communications. The UE0, the UE1, and the UE2 may be examples of UEs 115 as described with reference to FIGS. 1 and 2. Alternative examples of the following may be implemented, where some processes are performed in a different order than described or are not performed. In some cases, processes may include additional features not mentioned below, or further processes may be added.

At 305, 310, and 315, UE0, UE1, and UE2, respectively, may determine a preconfigured common shared key. For example, a network entity may distribute a common shared key to UE0, UE1, and UE2 in control signaling (e.g., higher layer signaling). Additionally, or alternatively, the common shared key may be otherwise defined. In some cases, UE0 may be an initiator UE in a PRS procedure, where UE1 and UE2 may be target UEs.

UE0 may discover a set of one or more target UEs, including UE1 and UE2. For example, at 320, UE0 may initiate a PRS session, or PRS procedure, and may use the certificates of the participant UEs (e.g., UE1 and UE2) to enable shared key agreement including the use of a session key for the PRS procedure. UE0 may be aware of target UEs (e.g., UE1 and UE2) via a discovery phase of the PRS procedure, and may verify the authenticity of the certificates of UE1 and UE2.

At 325, UE0 may generate a session key, $K_S$, independently from UE1 and UE2.

At 330 and 335, UE0 may use the public keys of target UEs, such as $K_{P_1}$ and $K_{P_2}$ for UE1 and UE2, respectively, to encode and transmit the PRS session key, $K_S$. That is, at 330, UE0 may transmit $f(K_S, K_{P_1})$ to UE1 and at 335, UE0 may transmit $f(K_S, K_{P_2})$ to UE2, where $f$ is a standardized key encoding function. In some examples, the UEs may exchange the public key of a public-private key pair for each UE (e.g., UE0, UE1, and UE2 may exchange public keys), such that UE0 may use the public keys of UE1 and UE2.

The target UEs may obtain (e.g., receive and decode) the PRS session key, $K_S$, using their individual private keys. For example, at 340, UE1 may obtain $K_S$ based on $K_S=\tilde{f}(K_S, \tilde{K}_{P_1})$ where $\tilde{f}$ is the standardized key decoding function, and $\tilde{K}_{P_1}$ is UE1's private key. Similarly, at 345, UE2 may obtain $K_S$ based on $K_S=\tilde{f}(K_S, \tilde{K}_{P_2})$, where $\tilde{K}_{P_2}$ is UE2's private key. In some other examples, the UE0 may provide UE1 and UE2 with a nonce, R, such that the UE1 and the UE2 may generate the PRS session key, $K_S$, using the nonce and the common shared key, $K_c$. The UE0, the UE1, and the UE2 may generate $K_S$ using a key derivation function, KDF (e.g., $K_S$=KDF($K_c$, R)), where KDF may be any standardized preconfigured key derivation function. In some examples, the UE1 and the UE2 may receive the indication of the session key from a network entity, where the session key is shared across UE0, UE1, and UE2.

The UE0, the UE1, and the UE2 may use the session key for the PRS procedure, including a pre-PRS, a PRS sequence, and a post-PRS as described with reference to FIG. 2. The pre-PRS message may be a first message of the PRS procedure, the PRS sequence may be a second message of the PRS procedure, and the post-PRS may be a third message of the PRS procedure. For example, at 350, 355, and 360, the UE0, the UE1, and the UE2, respectively, may use the session key, $K_S$, to derive a UE-specific key for transmitting the pre-PRS, PRS sequence, and post-PRS. Each UE in the ranging session (e.g., UE0, UE1, and UE2) may derive the UE-specific key based on session key $K_S$ and a L1 source ID. For example, at 350, UE0 may derive a UE-specific key as $K_{UE0}$=KDF($K_S$, UE0's L1 source ID), where KDF denotes the preconfigured key derivation function. At 355, UE1 may derive a UE-specific key as $K_{UE1}$=KDF($K_S$, UE1s L1 source ID) and at 360, UE2 may derive a UE-specific key as $K_{UE2}$=KDF($K_S$, UE2's L1 source ID). In some cases, the UE0, the UE1, and the UE2 may use the derived UE-specific key to encrypt a pre-PRS message. For example, at 365, UE0 may transmit a secure pre-PRS message to UE1 and UE2 using $K_{UE0}$. Additionally, or alternatively, the UE0, the UE1, and the UE2 may use a UE-specific key to provide a message authentication code for an unscrambled (e.g., plain) pre-PRS message or for an encrypted pre-PRS message along with the pre-PRS message.

In some examples, the UE0 may include additional signaling in the pre-PRS for securing a PRS sequence and post-PRS transmission. For example, the UE0 may transmit a nonce, $R_0$, in the secure pre-PRS message, which the UE may use as a parameter for PRS sequence generation and selection. Similarly, UE1 and UE2 may transmit pre-PRS messages to other UEs, where the pre-PRS messages may include one or more nonce, such as a nonce, $R_1$, from UE1 and a nonce, $R_2$, from UE2. The UE0, the UE1, and the UE2 may use $R_0$, $R_1$, and $R_2$ as a parameter for generating a key to use for a secure post-PRS transmission.

At 370 and 375, UE1 and UE2, respectively, may select a PRS sequence for the PRS procedure based on the session key. For example, at 370, UE1 may use the UE specific key $K_{UE1}$ to choose the PRS sequence to transmit. At 375, UE2 may use the UE specific key $K_{UE2}$ to choose the PRS sequence to transmit. The UE1 and the UE2 may use a formula to determine the PRS sequence, such as PRS sequence transmitted by UE1=$g(K_{UE1}$, PRS sequence set) and RS sequence transmitted by UE2=$g(K_{UE2}$, PRS sequence set), where g may be a preconfigured function (e.g., defined by a network entity or otherwise defined at the UEs). For example, UE1 may use a certain number of bits of $K_{UE1}$ (e.g., the last 6 bits of $K_{UE1}$) to select a single PRS sequence out of a set of PRS sequences (e.g., 64 PRS sequences). The PRS sequences may be defined at the UEs by a network entity or other configuration signaling (e.g., predefined).

In some other examples, the UEs may use the UE-specific key and a nonce to select the PRS sequence to transmit. For example, at 370, UE1 may use $K_{UE1}$ and the nonce $R_0$ that UE0 transmitted in the secure pre-PRS message to choose the PRS sequence to transmit. That is, a PRS sequence transmitted by UE1=$g(K_{UE1}, R_0$, PRS sequence set). Similarly, at 375, UE2 may use $K_{UE2}$ and the nonce $R_0$ that UE0 transmitted in the secure pre-PRS message to choose the PRS sequence to transmit. That is, a PRS sequence transmitted by UE2=$g(K_{UE2}, R_0$, PRS sequence set). In some cases, the UE0 may select a PRS sequence to transmit to UE1 and UE2 using a similar formula, such as PRS sequence transmitted by UE0=$g(K_{UE0}, R_1/2$, PRS sequence set).

At 380, the UE0, the UE1, the UE2, or any combination thereof may transmit the selected PRS sequence to each other. For example, UE0 may transmit a PRS sequence to UE1 and UE2. UE1 may transmit a PRS sequence to UE0 and UE2, which may be the same or different than the PRS sequence transmitted by UE0. UE2 may transmit a PRS sequence to UE0 and UE1, which may be the same or different than the PRS sequence transmitted by UE1 and/or UE2. The PRS sequence may be a series of PRSs, which may provide the other UEs with positioning or ranging information of the transmitting UE. For example, the receiving UE may perform one or more measurements, such as an RTT measurement, to obtain measurement information for the position and range of the other UEs.

In some examples, at 385, the UE0, the UE1, the UE2, or any combination thereof may transmit a post-PRS transmission with the one or more measurements from the PRS sequence. For example, UE0 may transmit a post-PRS transmission to UE1 and UE2, UE1 may transmit a post-PRS transmission to UE0 and UE2, and UE2 may transmit a post-PRS transmission to UE0 and UE1. The UE0, the UE1, the UE2, or any combination thereof may encode (e.g., encrypt) the measurement information in the post-PRS to secure the post-PRS transmission. For example, each UE may use a UE-specific key to encode the post-PRS message, such that UE0 uses $K_{UE0}$ to encode the post-PRS message, UE1 uses $K_{UE1}$ to encode the post-PRS message, and UE2 uses $K_{UE2}$ to encode the post-PRS message. Additionally, or alternatively, the UE0, the UE1, the UE2, or any combination thereof may use the UE-specific key to provide a message authentication code for the encoded or unencoded post-PRS message.

In some other examples, the UE0, the UE1, the UE2, or any combination thereof may derive an additional key, such as a post-PRS key, according to a formula, such that UE0 derives the post-PRS key using $K_{postPRS,UE0}=g(K_{UE0}, R_0)$, UE1 derives the post-PRS key using $K_{postPRS,UE1}=g(K_{UE1}, R_1)$, and UE2 derives the post-PRS key using $K_{postPRS,UE2}=g(K_{UE2}, R_2)$ UE, where $R_0$, $R_1$, and $R_2$ are the nonce UE0, UE1, and UE2, respectively, transmitted in the secure pre-PRS message. The UE0, the UE1, and the UE2 may use the post-PRS key to encrypt, or encode, the post-PRS instead of the UE-specific key.

Figure 4:
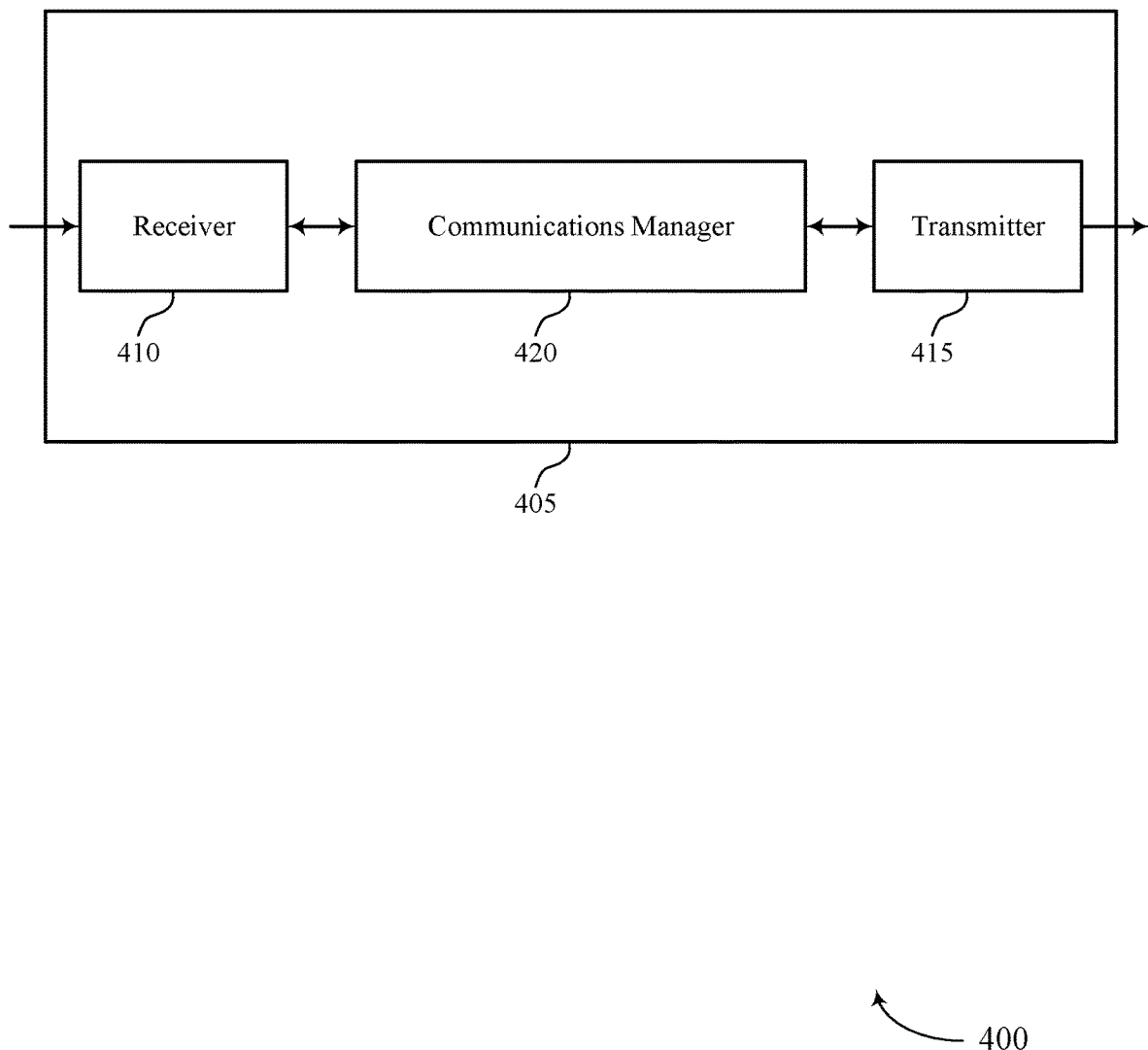
FIGS. 4 and 5 show block diagrams of devices that support methods for secure sidelink positioning in accordance with one or more aspects of the present disclosure.

FIG. 4 shows a block diagram 400 of a device 405 that supports methods for secure sidelink positioning in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to methods for secure sidelink positioning). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to methods for secure sidelink positioning). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of methods for secure sidelink positioning as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a first UE in accordance with examples as disclosed herein. For example, the communications manager 420 may be configured as or otherwise support a means for receiving an indication of a session key for a PRS procedure to be performed with at least a second UE. The communications manager 420 may be configured as or otherwise support a means for selecting a PRS sequence for the PRS procedure based on the session key. The communications manager 420 may be configured as or otherwise support a means for transmitting the selected PRS sequence to the second UE.

Additionally, or alternatively, the communications manager 420 may support wireless communication at a second UE in accordance with examples as disclosed herein. For example, the communications manager 420 may be configured as or otherwise support a means for transmitting an indication of a session key for a PRS procedure to be performed with at least a first UE. The communications manager 420 may be configured as or otherwise support a means for receiving, from the first UE, a PRS sequence of the PRS procedure according to the session key.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for a UE using cryptographic keys to perform a PRS procedure with one or more other UEs via sidelink communications, which may provide for reduced processing, reduced power consumption, more efficient utilization of communication resources, and the like.

Figure 5:
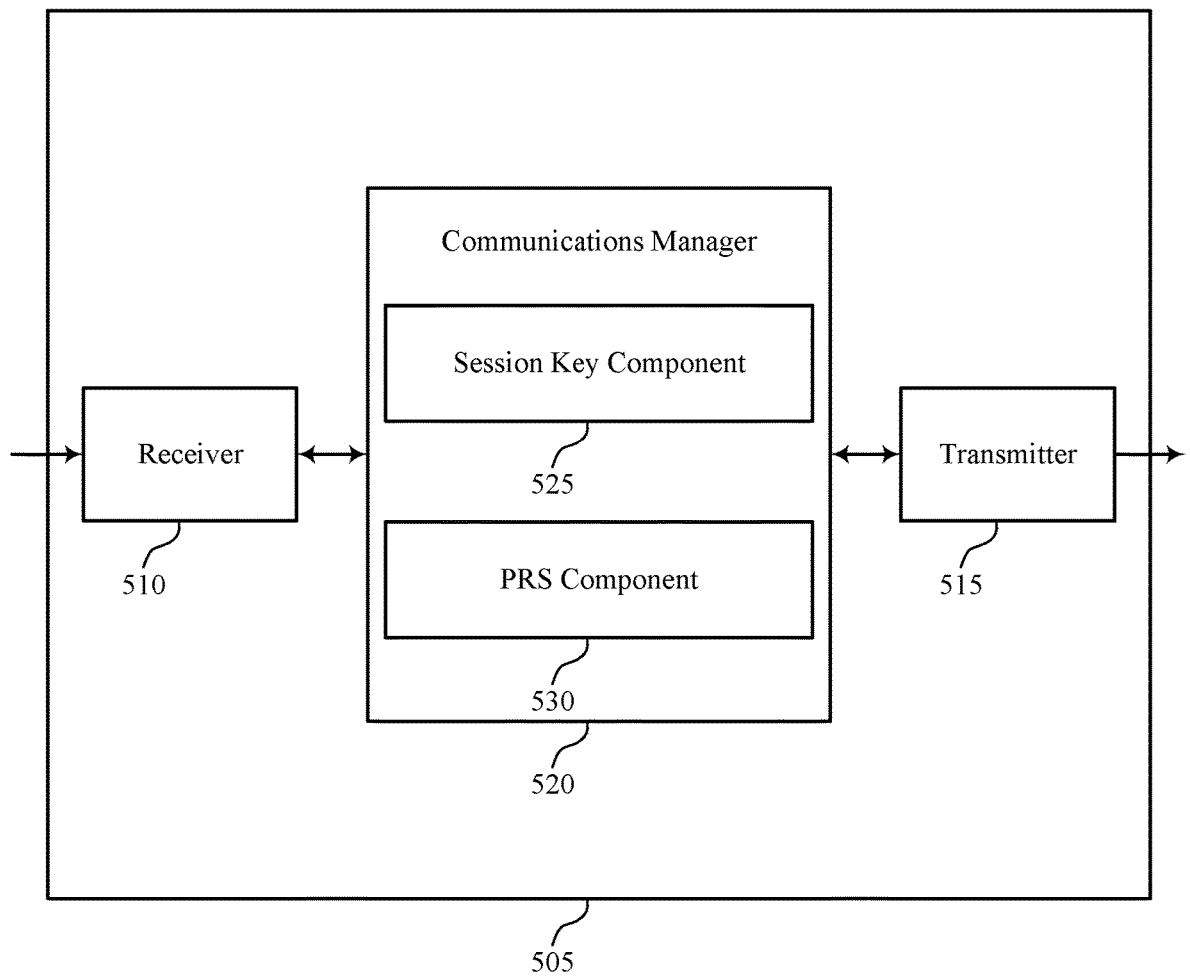

FIG. 5 shows a block diagram 500 of a device 505 that supports methods for secure sidelink positioning in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to methods for secure sidelink positioning). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to methods for secure sidelink positioning). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of methods for secure sidelink positioning as described herein. For example, the communications manager 520 may include a session key component 525 an PRS component 530, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first UE in accordance with examples as disclosed herein. The session key component 525 may be configured as or otherwise support a means for receiving an indication of a session key for a PRS procedure to be performed with at least a second UE. The PRS component 530 may be configured as or otherwise support a means for selecting a PRS sequence for the PRS procedure based on the session key. The PRS component 530 may be configured as or otherwise support a means for transmitting the selected PRS sequence to the second UE.

Additionally, or alternatively, the communications manager 520 may support wireless communication at a second UE in accordance with examples as disclosed herein. The session key component 525 may be configured as or otherwise support a means for transmitting an indication of a session key for a PRS procedure to be performed with at least a first UE. The PRS component 530 may be configured as or otherwise support a means for receiving, from the first UE, a PRS sequence of the PRS procedure according to the session key.

Figure 6:
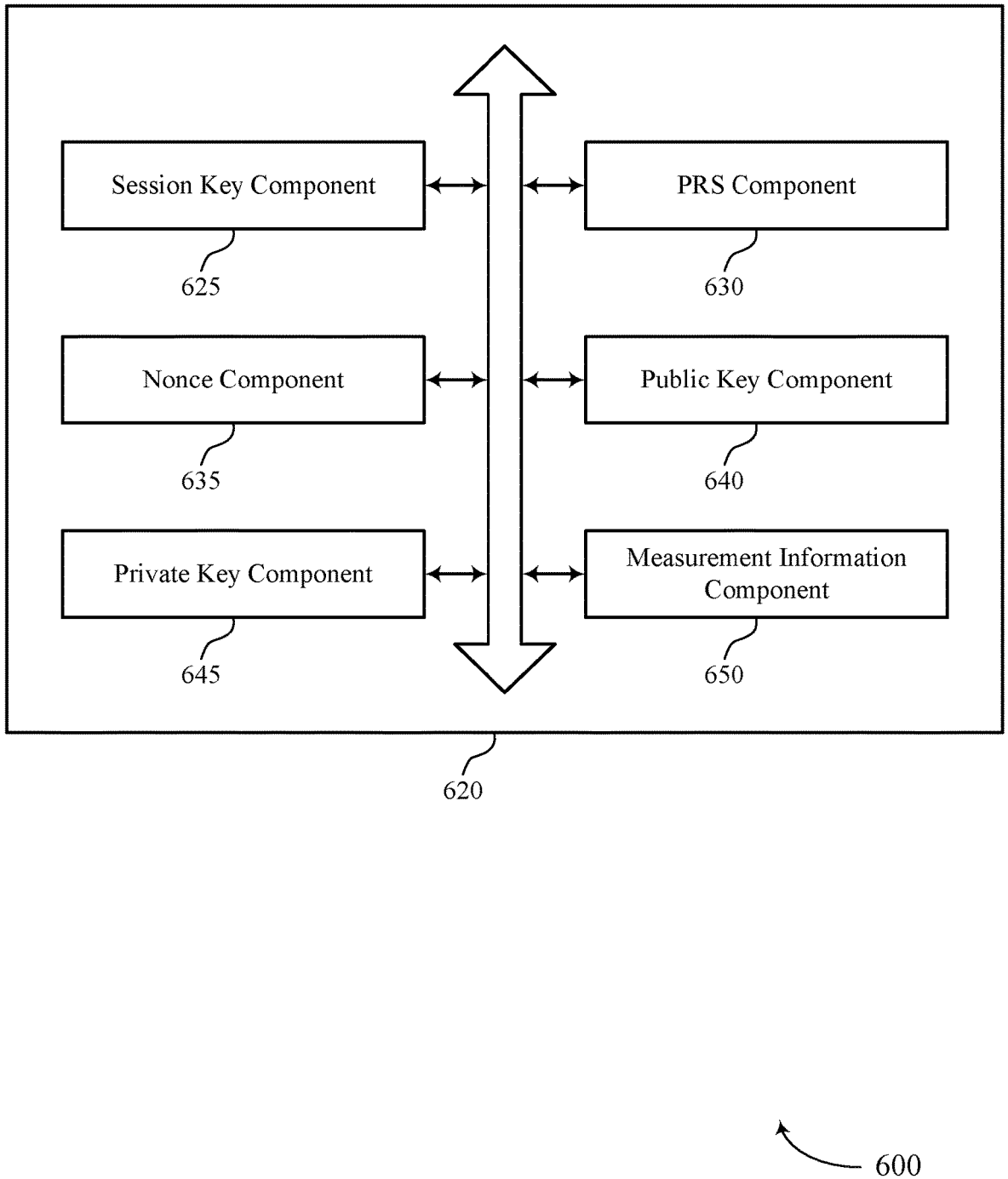
FIG. 6 shows a block diagram of a communications manager that supports methods for secure sidelink positioning in accordance with one or more aspects of the present disclosure.

FIG. 6 shows a block diagram 600 of a communications manager 620 that supports methods for secure sidelink positioning in accordance with one or more aspects of the present disclosure. The communications manager 620 may be an example of aspects of a communications manager 420, a communications manager 520, or both, as described herein. The communications manager 620, or various components thereof, may be an example of means for performing various aspects of methods for secure sidelink positioning as described herein. For example, the communications manager 620 may include a session key component 625, an PRS component 630, a nonce component 635, a public key component 640, a private key component 645, a measurement information component 650, or any combination thereof. Each of these components may communicate, directly or indirectly, with one another (e.g., via one or more buses).

The communications manager 620 may support wireless communication at a first UE in accordance with examples as disclosed herein. The session key component 625 may be configured as or otherwise support a means for receiving an indication of a session key for a PRS procedure to be performed with at least a second UE. The PRS component 630 may be configured as or otherwise support a means for selecting a PRS sequence for the PRS procedure based on the session key. In some examples, the PRS component 630 may be configured as or otherwise support a means for transmitting the selected PRS sequence to the second UE.

In some examples, the nonce component 635 may be configured as or otherwise support a means for receiving a first message of the PRS procedure including a nonce for the PRS sequence, where selecting the PRS sequence is based on the nonce and the session key.

In some examples, the nonce component 635 may be configured as or otherwise support a means for receiving a first message of the PRS procedure including a nonce for a second session key for a second message of the PRS procedure. In some examples, the PRS component 630 may be configured as or otherwise support a means for transmitting the second message according to the second session key.

In some examples, the public key component 640 may be configured as or otherwise support a means for transmitting, to the second UE, a public key of a public-private key pair associated with the first UE. In some examples, the session key component 625 may be configured as or otherwise support a means for receiving the session key from the second UE, the session key encoded according to the public key. In some examples, the private key component 645 may be configured as or otherwise support a means for decoding the session key using a private key of the public-private key pair.

In some examples, to support selecting the PRS sequence, the PRS component 630 may be configured as or otherwise support a means for selecting the PRS sequence based on a UE-specific key associated with the first UE, a nonce corresponding to the PRS sequence, or both.

In some examples, the PRS component 630 may be configured as or otherwise support a means for receiving, from the second UE, a first message of the PRS procedure. In some examples, the session key component 625 may be configured as or otherwise support a means for decoding the first message using the session key and a source ID for the second UE.

In some examples, the measurement information component 650 may be configured as or otherwise support a means for encoding measurement information associated with the PRS sequence using a UE-specific key corresponding to the first UE. In some examples, the measurement information component 650 may be configured as or otherwise support a means for transmitting the encoded measurement information to the second UE.

In some examples, the measurement information component 650 may be configured as or otherwise support a means for transmitting a message authentication code for the encoded measurement information associated with the PRS sequence.

In some examples, the PRS component 630 may be configured as or otherwise support a means for receiving, from the second UE, a second PRS sequence based on transmitting the selected PRS sequence.

In some examples, to support receiving the indication of the session key, the session key component 625 may be configured as or otherwise support a means for receiving the session key from a network entity, where the session key is shared across a set of multiple UEs including at least the first UE and the second UE.

In some examples, the session key component 625 may be configured as or otherwise support a means for generating the session key based on a key derivation function.

In some examples, the session key is based on the indication of the session key and a source ID associated with the first UE.

Additionally, or alternatively, the communications manager 620 may support wireless communication at a second UE in accordance with examples as disclosed herein. In some examples, the session key component 625 may be configured as or otherwise support a means for transmitting an indication of a session key for a PRS procedure to be performed with at least a first UE. In some examples, the PRS component 630 may be configured as or otherwise support a means for receiving, from the first UE, a PRS sequence of the PRS procedure according to the session key.

In some examples, the nonce component 635 may be configured as or otherwise support a means for transmitting a first message of the PRS procedure including a nonce for the PRS sequence.

In some examples, the nonce component 635 may be configured as or otherwise support a means for transmitting a first message of the PRS procedure including a nonce for a second session key for a second message of the PRS procedure. In some examples, the PRS component 630 may be configured as or otherwise support a means for receiving the second message according to the second session key.

In some examples, the public key component 640 may be configured as or otherwise support a means for receiving, from the first UE, a public key of a public-private key pair associated with the first UE. In some examples, the session key component 625 may be configured as or otherwise support a means for encoding the session key using the public key of the public-private key pair. In some examples, the session key component 625 may be configured as or otherwise support a means for transmitting the encoded session key.

In some examples, the session key component 625 may be configured as or otherwise support a means for generating a UE-specific key corresponding to the second UE based on the session key and a source ID for the second UE. In some examples, the PRS component 630 may be configured as or otherwise support a means for encoding a first message of the PRS procedure using the UE-specific key. In some examples, the PRS component 630 may be configured as or otherwise support a means for transmitting the encoded first message to the first UE.

In some examples, the measurement information component 650 may be configured as or otherwise support a means for receiving, from the first UE, measurement information associated with the PRS sequence. In some examples, the measurement information component 650 may be configured as or otherwise support a means for decoding the measurement information using the session key, a source ID for the first UE, or both.

In some examples, the measurement information component 650 may be configured as or otherwise support a means for receiving a message authentication code for the measurement information associated with the PRS sequence, where decrypting the measurement information is based on the message authentication code.

In some examples, the PRS component 630 may be configured as or otherwise support a means for transmitting, to the first UE, a second PRS sequence based on receiving the PRS sequence.

In some examples, the session key component 625 may be configured as or otherwise support a means for receiving the session key from a network entity, where the session key is shared across a set of multiple UEs including at least the first UE and the second UE.

In some examples, the session key component 625 may be configured as or otherwise support a means for generating the session key based on a key derivation function.

Figure 7:
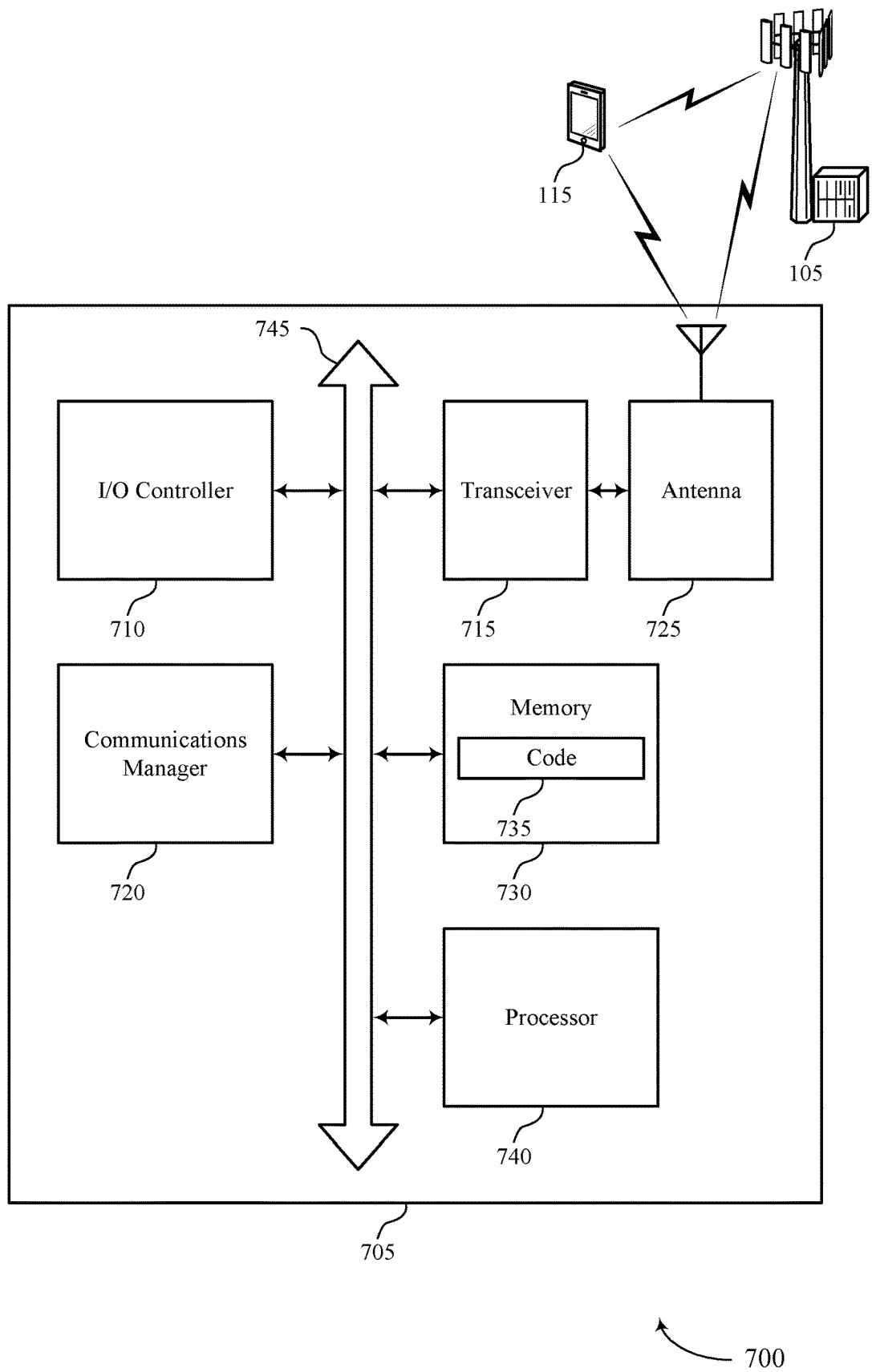
FIG. 7 shows a diagram of a system including a device that supports methods for secure sidelink positioning in accordance with one or more aspects of the present disclosure.

FIG. 7 shows a diagram of a system 700 including a device 705 that supports methods for secure sidelink positioning in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting methods for secure sidelink positioning). For example, the device 705 or a component of the device 705 may include a processor 740 and memory 730 coupled with or to the processor 740, the processor 740 and memory 730 configured to perform various functions described herein.

The communications manager 720 may support wireless communication at a first UE in accordance with examples as disclosed herein. For example, the communications manager 720 may be configured as or otherwise support a means for receiving an indication of a session key for a PRS procedure to be performed with at least a second UE. The communications manager 720 may be configured as or otherwise support a means for selecting a PRS sequence for the PRS procedure based on the session key. The communications manager 720 may be configured as or otherwise support a means for transmitting the selected PRS sequence to the second UE.

Additionally, or alternatively, the communications manager 720 may support wireless communication at a second UE in accordance with examples as disclosed herein. For example, the communications manager 720 may be configured as or otherwise support a means for transmitting an indication of a session key for a PRS procedure to be performed with at least a first UE. The communications manager 720 may be configured as or otherwise support a means for receiving, from the first UE, a PRS sequence of the PRS procedure according to the session key.

By including or configuring the communications manager 720 in accordance with examples as described herein, the device 705 may support techniques for a UE using cryptographic keys to perform a PRS procedure with one or more other UEs via sidelink communications, which may provide for improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of methods for secure sidelink positioning as described herein, or the processor 740 and the memory 730 may be otherwise configured to perform or support such operations.

Figure 8:
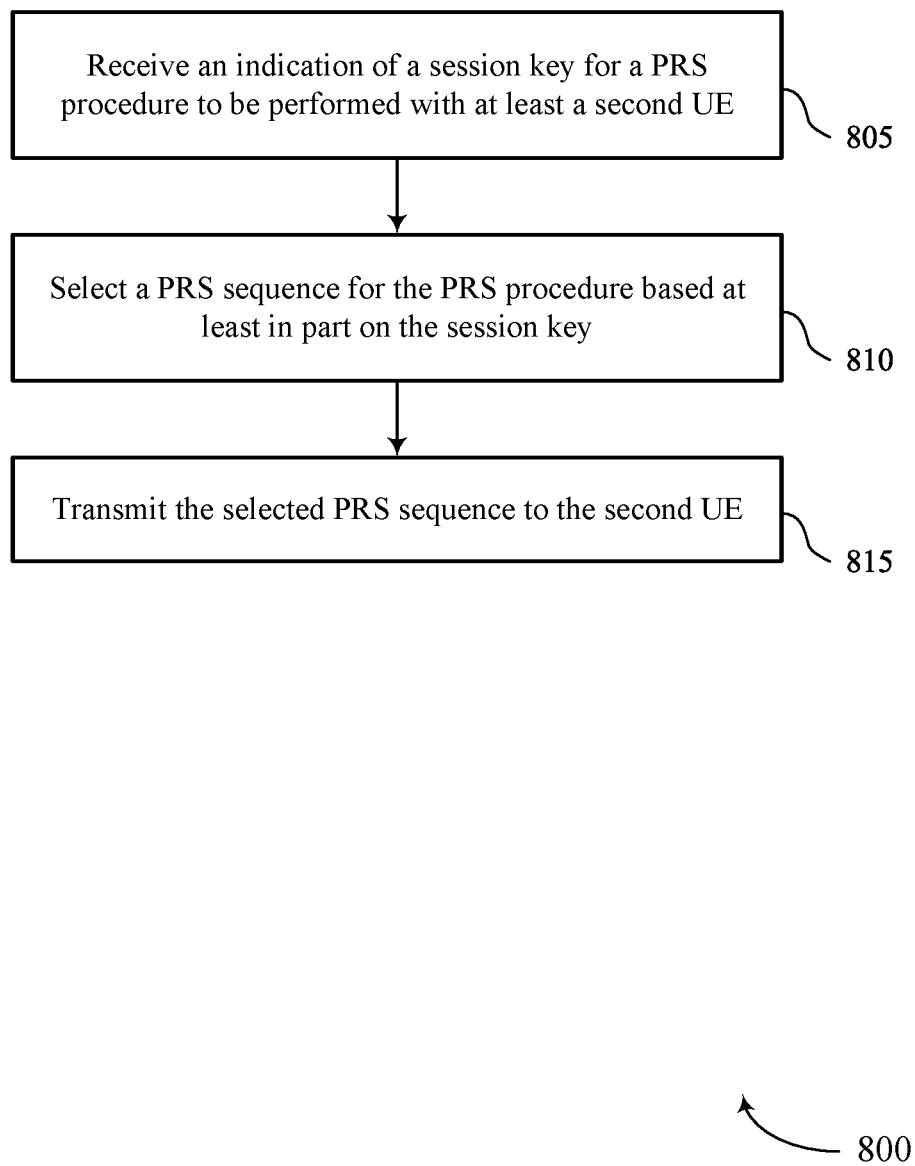
FIGS. 8 through 11 show flowcharts illustrating methods that support methods for secure sidelink positioning in accordance with one or more aspects of the present disclosure.

FIG. 8 shows a flowchart illustrating a method 800 that supports methods for secure sidelink positioning in accordance with one or more aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include receiving an indication of a session key for a PRS procedure to be performed with at least a second UE. The operations of 805 may be performed in accordance with examples as disclosed herein. In some examples, aspects of the operations of 805 may be performed by a session key component 625 as described with reference to FIG. 6.

At 810, the method may include selecting a PRS sequence for the PRS procedure based on the session key. The operations of 810 may be performed in accordance with examples as disclosed herein. In some examples, aspects of the operations of 810 may be performed by an PRS component 630 as described with reference to FIG. 6.

At 815, the method may include transmitting the selected PRS sequence to the second UE. The operations of 815 may be performed in accordance with examples as disclosed herein. In some examples, aspects of the operations of 815 may be performed by an PRS component 630 as described with reference to FIG. 6.

Figure 9:
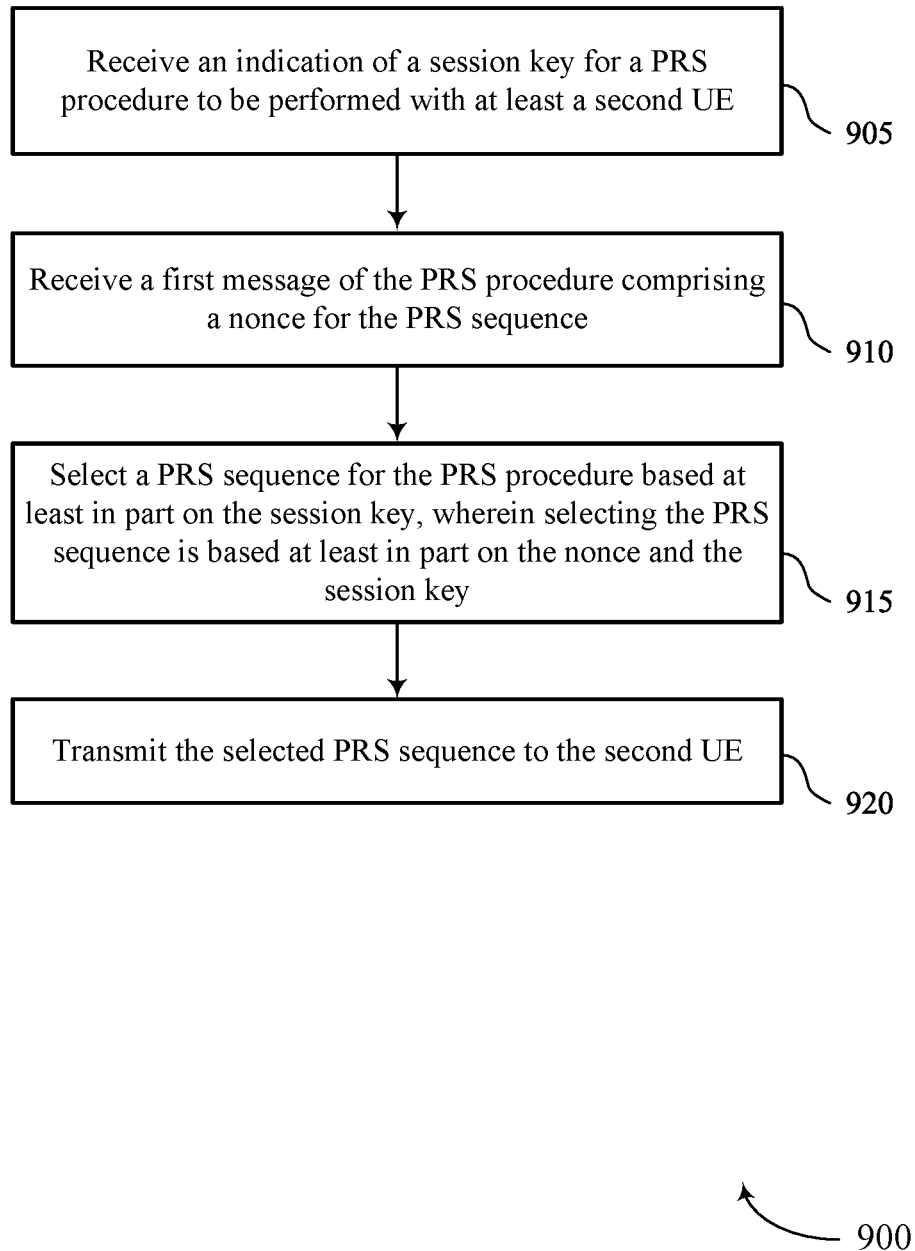

FIG. 9 shows a flowchart illustrating a method 900 that supports methods for secure sidelink positioning in accordance with one or more aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 905, the method may include receiving an indication of a session key for a PRS procedure to be performed with at least a second UE. The operations of 905 may be performed in accordance with examples as disclosed herein. In some examples, aspects of the operations of 905 may be performed by a session key component 625 as described with reference to FIG. 6.

At 910, the method may include receiving a first message of the PRS procedure including a nonce for the PRS sequence. The operations of 910 may be performed in accordance with examples as disclosed herein. In some examples, aspects of the operations of 910 may be performed by a nonce component 635 as described with reference to FIG. 6.

At 915, the method may include selecting a PRS sequence for the PRS procedure based on the session key, where selecting the PRS sequence is based on the nonce and the session key. The operations of 915 may be performed in accordance with examples as disclosed herein. In some examples, aspects of the operations of 915 may be performed by an PRS component 630 as described with reference to FIG. 6.

At 920, the method may include transmitting the selected PRS sequence to the second UE. The operations of 920 may be performed in accordance with examples as disclosed herein. In some examples, aspects of the operations of 920 may be performed by an PRS component 630 as described with reference to FIG. 6.

Figure 10:
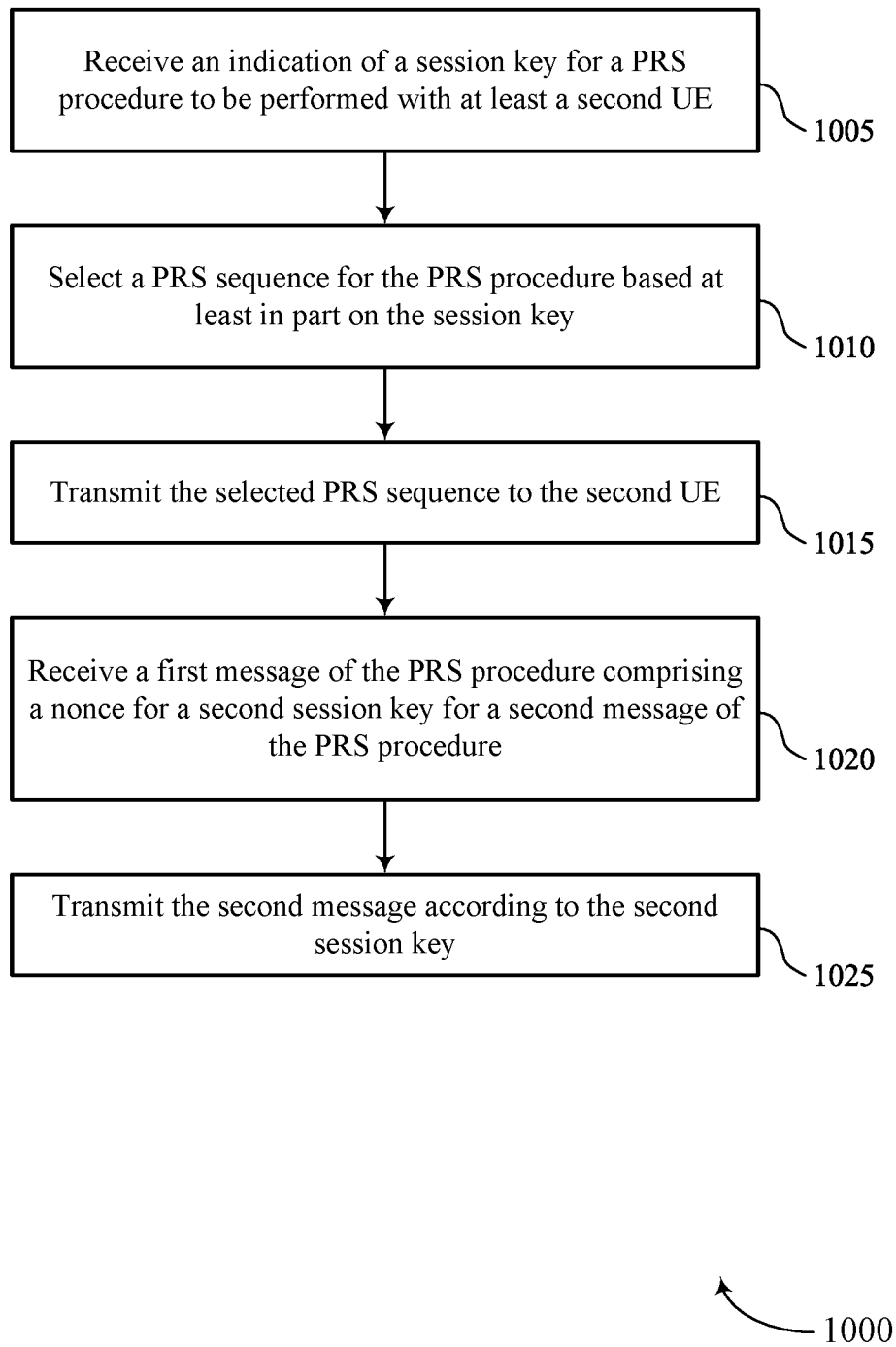

FIG. 10 shows a flowchart illustrating a method 1000 that supports methods for secure sidelink positioning in accordance with one or more aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1005, the method may include receiving an indication of a session key for a PRS procedure to be performed with at least a second UE. The operations of 1005 may be performed in accordance with examples as disclosed herein. In some examples, aspects of the operations of 1005 may be performed by a session key component 625 as described with reference to FIG. 6.

At 1010, the method may include selecting a PRS sequence for the PRS procedure based on the session key. The operations of 1010 may be performed in accordance with examples as disclosed herein. In some examples, aspects of the operations of 1010 may be performed by an PRS component 630 as described with reference to FIG. 6.

At 1015, the method may include transmitting the selected PRS sequence to the second UE. The operations of 1015 may be performed in accordance with examples as disclosed herein. In some examples, aspects of the operations of 1015 may be performed by an PRS component 630 as described with reference to FIG. 6.

At 1020, the method may include receiving a first message of the PRS procedure including a nonce for a second session key for a second message of the PRS procedure. The operations of 1020 may be performed in accordance with examples as disclosed herein. In some examples, aspects of the operations of 1020 may be performed by a nonce component 635 as described with reference to FIG. 6.

At 1025, the method may include transmitting the second message according to the second session key. The operations of 1025 may be performed in accordance with examples as disclosed herein. In some examples, aspects of the operations of 1025 may be performed by an PRS component 630 as described with reference to FIG. 6.

Figure 11:
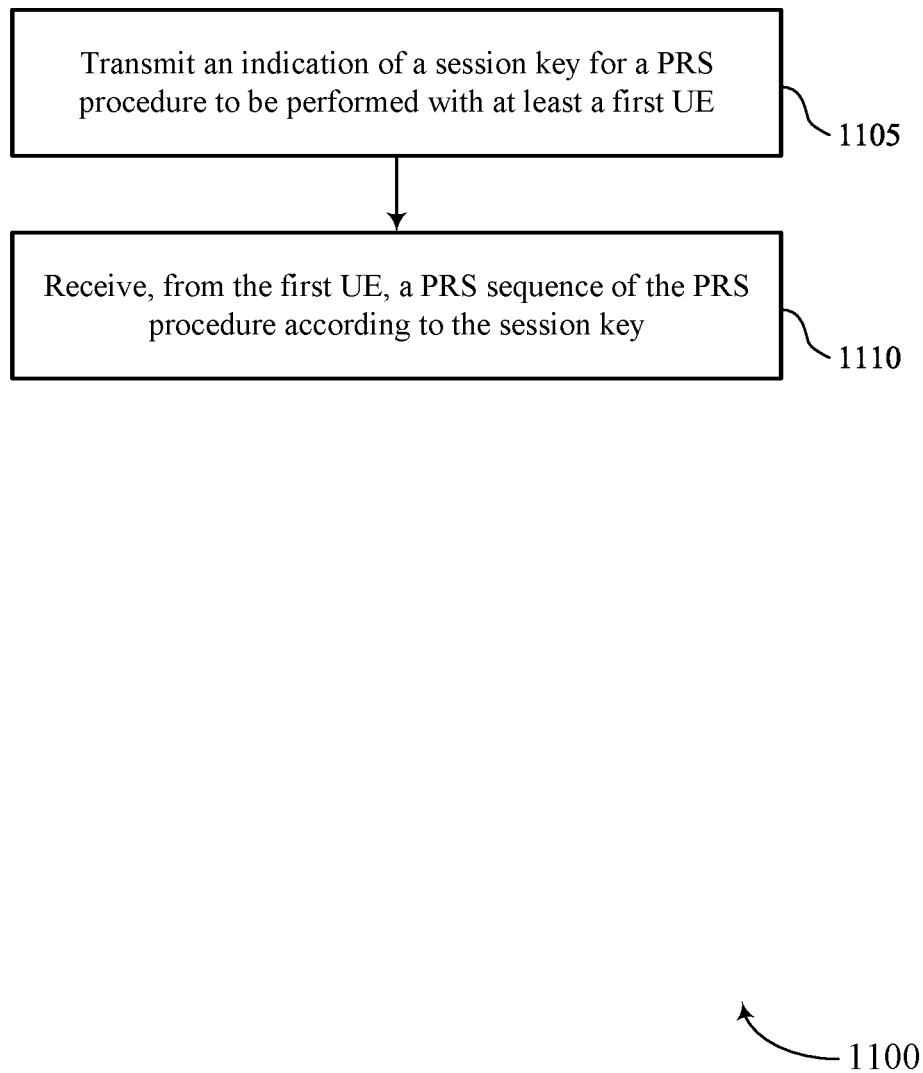

FIG. 11 shows a flowchart illustrating a method 1100 that supports methods for secure sidelink positioning in accordance with one or more aspects of the present disclosure. The operations of the method 1100 may be implemented by a UE or its components as described herein. For example, the operations of the method 1100 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1105, the method may include transmitting an indication of a session key for a PRS procedure to be performed with at least a first UE. The operations of 1105 may be performed in accordance with examples as disclosed herein.

In some examples, aspects of the operations of 1105 may be performed by a session key component 625 as described with reference to FIG. 6.

At 1110, the method may include receiving, from the first UE, a PRS sequence of the PRS procedure according to the session key. The operations of 1110 may be performed in accordance with examples as disclosed herein. In some examples, aspects of the operations of 1110 may be performed by an PRS component 630 as described with reference to FIG. 6.

The following provides an overview of aspects of the present disclosure:

Aspect 1: A method for wireless communication at a first UE, comprising: receiving an indication of a session key for a positioning reference signal procedure to be performed with at least a second UE; selecting a positioning reference signal sequence for the positioning reference signal procedure based at least in part on the session key; and transmitting the selected positioning reference signal sequence to the second UE.

Aspect 2: The method of aspect 1, further comprising: receiving a first message of the positioning reference signal procedure comprising a nonce for the positioning reference signal sequence, wherein selecting the positioning reference signal sequence is based at least in part on the nonce and the session key.

Aspect 3: The method of any of aspects 1 through 2, further comprising: receiving a first message of the positioning reference signal procedure comprising a nonce for a second session key for a second message of the positioning reference signal procedure; and transmitting the second message according to the second session key.

Aspect 4: The method of any of aspects 1 through 3, further comprising: transmitting, to the second UE, a public key of a public-private key pair associated with the first UE; receiving the session key from the second UE, the session key encoded according to the public key; and decoding the session key using a private key of the public-private key pair.

Aspect 5: The method of any of aspects 1 through 4, wherein selecting the positioning reference signal sequence further comprises: selecting the positioning reference signal sequence based at least in part on a UE-specific key associated with the first UE, a nonce corresponding to the positioning reference signal sequence, or both.

Aspect 6: The method of any of aspects 1 through 5, further comprising: receiving, from the second UE, a first message of the positioning reference signal procedure; and decoding the first message using the session key and a source identifier for the second UE.

Aspect 7: The method of any of aspects 1 through 6, further comprising: encoding measurement information associated with the positioning reference signal sequence using a UE-specific key corresponding to the first UE; and transmitting the encoded measurement information to the second UE.

Aspect 8: The method of aspect 7, further comprising: transmitting a message authentication code for the encoded measurement information associated with the positioning reference signal sequence.

Aspect 9: The method of any of aspects 1 through 8, further comprising: receiving, from the second UE, a second positioning reference signal sequence based at least in part on transmitting the selected positioning reference signal sequence.

Aspect 10: The method of any of aspects 1 through 9, wherein receiving the indication of the session key comprises: receiving the session key from a network entity, wherein the session key is shared across a plurality of UEs comprising at least the first UE and the second UE.

Aspect 11: The method of any of aspects 1 through 10, further comprising: generating the session key based at least in part on a key derivation function.

Aspect 12: The method of any of aspects 1 through 11, wherein the session key is based at least in part on the indication of the session key and a source identifier associated with the first UE.

Aspect 13: A method for wireless communication at a second UE, comprising: transmitting an indication of a session key for a positioning reference signal procedure to be performed with at least a first UE; and receiving, from the first UE, a positioning reference signal sequence of the positioning reference signal procedure according to the session key.

Aspect 14: The method of aspect 13, further comprising: transmitting a first message of the positioning reference signal procedure comprising a nonce for the positioning reference signal sequence.

Aspect 15: The method of any of aspects 13 through 14, further comprising: transmitting a first message of the positioning reference signal procedure comprising a nonce for a second session key for a second message of the positioning reference signal procedure; and receiving the second message according to the second session key.

Aspect 16: The method of any of aspects 13 through 15, further comprising: receiving, from the first UE, a public key of a public-private key pair associated with the first UE; encoding the session key using the public key of the public-private key pair; and transmitting the encoded session key.

Aspect 17: The method of any of aspects 13 through 16, further comprising: generating a UE-specific key corresponding to the second UE based at least in part on the session key and a source identifier for the second UE; encoding a first message of the positioning reference signal procedure using the UE-specific key; and transmitting the encoded first message to the first UE.

Aspect 18: The method of any of aspects 13 through 17, further comprising: receiving, from the first UE, measurement information associated with the positioning reference signal sequence; and decoding the measurement information using the session key, a source identifier for the first UE, or both.

Aspect 19: The method of aspect 18, further comprising: receiving a message authentication code for the measurement information associated with the positioning reference signal sequence, wherein decrypting the measurement information is based at least in part on the message authentication code.

Aspect 20: The method of any of aspects 13 through 19, further comprising: transmitting, to the first UE, a second positioning reference signal sequence based at least in part on receiving the positioning reference signal sequence.

Aspect 21: The method of any of aspects 13 through 20, further comprising: receiving the session key from a network entity, wherein the session key is shared across a plurality of UEs comprising at least the first UE and the second UE.

Aspect 22: The method of any of aspects 13 through 21, further comprising: generating the session key based at least in part on a key derivation function.

Aspect 23: An apparatus for wireless communication at a first UE, comprising a processor; memory coupled with the processor; and instructions stored in the memory and executable by the processor to cause the apparatus to perform a method of any of aspects 1 through 12.

Aspect 24: An apparatus for wireless communication at a first UE, comprising at least one means for performing a method of any of aspects 1 through 12.

Aspect 25: A non-transitory computer-readable medium storing code for wireless communication at a first UE, the code comprising instructions executable by a processor to perform a method of any of aspects 1 through 12.

Aspect 26: An apparatus for wireless communication at a second UE, comprising a processor; memory coupled with the processor; and instructions stored in the memory and executable by the processor to cause the apparatus to perform a method of any of aspects 13 through 22.

Aspect 27: An apparatus for wireless communication at a second UE, comprising at least one means for performing a method of any of aspects 13 through 22.

Aspect 28: A non-transitory computer-readable medium storing code for wireless communication at a second UE, the code comprising instructions executable by a processor to perform a method of any of aspects 13 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving an indication of a session key for a positioning reference signal procedure to be performed with at least a second UE;
   selecting a positioning reference signal sequence for the positioning reference signal procedure based at least in part on the session key; and
   transmitting the selected positioning reference signal sequence to the second UE.

2. The method of claim 1, further comprising:
   receiving a first message of the positioning reference signal procedure comprising a nonce for the positioning reference signal sequence, wherein selecting the positioning reference signal sequence is based at least in part on the nonce and the session key.

3. The method of claim 1, further comprising:
   receiving a first message of the positioning reference signal procedure comprising a nonce for a second session key for a second message of the positioning reference signal procedure; and
   transmitting the second message according to the second session key.

4. The method of claim 1, further comprising:
   transmitting, to the second UE, a public key of a public-private key pair associated with the first UE;
   receiving the session key from the second UE, the session key encoded according to the public key; and
   decoding the session key using a private key of the public-private key pair.

5. The method of claim 1, wherein selecting the positioning reference signal sequence further comprises:
   selecting the positioning reference signal sequence based at least in part on a UE-specific key associated with the first UE, a nonce corresponding to the positioning reference signal sequence, or both.

6. The method of claim 1, further comprising:
   receiving, from the second UE, a first message of the positioning reference signal procedure; and
   decoding the first message using the session key and a source identifier for the second UE.

7. The method of claim 1, further comprising:
   encoding measurement information associated with the positioning reference signal sequence using a UE-specific key corresponding to the first UE; and
   transmitting the encoded measurement information to the second UE.

8. The method of claim 7, further comprising:
   transmitting a message authentication code for the encoded measurement information associated with the positioning reference signal sequence.

9. The method of claim 1, further comprising:
   receiving, from the second UE, a second positioning reference signal sequence based at least in part on transmitting the selected positioning reference signal sequence.

10. The method of claim 1, wherein receiving the indication of the session key comprises:
    receiving the session key from a network entity, wherein the session key is shared across a plurality of UEs comprising at least the first UE and the second UE.

11. The method of claim 1, further comprising:
    generating the session key based at least in part on a key derivation function.

12. The method of claim 1, wherein the session key is based at least in part on the indication of the session key and a source identifier associated with the first UE.

13. A method for wireless communication at a second user equipment (UE), comprising:
    transmitting an indication of a session key for a positioning reference signal procedure to be performed with at least a first UE; and
    receiving, from the first UE, a positioning reference signal sequence of the positioning reference signal procedure according to the session key.

14. The method of claim 13, further comprising:
    transmitting a first message of the positioning reference signal procedure comprising a nonce for the positioning reference signal sequence.

15. The method of claim 13, further comprising:
    transmitting a first message of the positioning reference signal procedure comprising a nonce for a second session key for a second message of the positioning reference signal procedure; and
    receiving the second message according to the second session key.

16. The method of claim 13, further comprising:
    receiving, from the first UE, a public key of a public-private key pair associated with the first UE;
    encoding the session key using the public key of the public-private key pair; and
    transmitting the encoded session key.

17. The method of claim 13, further comprising:
    generating a UE-specific key corresponding to the second UE based at least in part on the session key and a source identifier for the second UE;

encoding a first message of the positioning reference signal procedure using the UE-specific key; and transmitting the encoded first message to the first UE.

18. The method of claim 13, further comprising:

receiving, from the first UE, measurement information associated with the positioning reference signal sequence; and decoding the measurement information using the session key, a source identifier for the first UE, or both.

19. The method of claim 18, further comprising:

receiving a message authentication code for the measurement information associated with the positioning reference signal sequence, wherein decrypting the measurement information is based at least in part on the message authentication code.

20. The method of claim 13, further comprising:

transmitting, to the first UE, a second positioning reference signal sequence based at least in part on receiving the positioning reference signal sequence.

21. The method of claim 13, further comprising:

receiving the session key from a network entity, wherein the session key is shared across a plurality of UEs comprising at least the first UE and the second UE.

22. The method of claim 13, further comprising:

generating the session key based at least in part on a key derivation function.

23. An apparatus for wireless communication at a first user equipment (UE), comprising:

a processor;

memory coupled with the processor; and instructions stored in the memory and executable by the processor to cause the apparatus to:

receive an indication of a session key for a positioning reference signal procedure to be performed with at least a second UE;

select a positioning reference signal sequence for the positioning reference signal procedure based at least in part on the session key; and transmit the selected positioning reference signal sequence to the second UE.

24. The apparatus of claim 23, wherein the instructions are further executable by the processor to cause the apparatus to:

receive a first message of the positioning reference signal procedure comprising a nonce for the positioning reference signal sequence, wherein selecting the positioning reference signal sequence is based at least in part on the nonce and the session key.

25. The apparatus of claim 23, wherein the instructions are further executable by the processor to cause the apparatus to:

receive a first message of the positioning reference signal procedure comprising a nonce for a second session key for a second message of the positioning reference signal procedure; and transmit the second message according to the second session key.

26. The apparatus of claim 23, wherein the instructions are further executable by the processor to cause the apparatus to:

transmit, to the second UE, a public key of a public-private key pair associated with the first UE;

receive the session key from the second UE, the session key encoded according to the public key; and decode the session key using a private key of the public-private key pair.

27. The apparatus of claim 23, wherein the instructions to select the positioning reference signal sequence are further executable by the processor to cause the apparatus to:

select the positioning reference signal sequence based at least in part on a UE-specific key associated with the first UE, a nonce corresponding to the positioning reference signal sequence, or both.

28. The apparatus of claim 23, wherein the instructions are further executable by the processor to cause the apparatus to:

receive, from the second UE, a first message of the positioning reference signal procedure; and decode the first message using the session key and a source identifier for the second UE.

29. The apparatus of claim 23, wherein the instructions are further executable by the processor to cause the apparatus to:

encode measurement information associated with the positioning reference signal sequence using a UE-specific key corresponding to the first UE; and transmit the encoded measurement information to the second UE.

30. An apparatus for wireless communication at a second user equipment (UE), comprising:

a processor;

memory coupled with the processor; and instructions stored in the memory and executable by the processor to cause the apparatus to:

transmit an indication of a session key for a positioning reference signal procedure to be performed with at least a first UE; and receive, from the first UE, a positioning reference signal sequence of the positioning reference signal procedure according to the session key.

* * * * *